(12) United States Patent
Wei et al.

(10) Patent No.: US 10,762,122 B2
(45) Date of Patent: Sep. 1, 2020

(54) METHOD AND DEVICE FOR ASSESSING QUALITY OF MULTIMEDIA RESOURCE

(71) Applicant: YOUKU INTERNET TECHNOLOGY (BEIJING) CO., LTD., Beijing (CN)

(72) Inventors: Bo Wei, Beijing (CN); Zhibing Qi, Beijing (CN); Yuantu Wang, Beijing (CN); Guangxu Ma, Beijing (CN); Yuping Liu, Beijing (CN); Yuzong Yin, Beijing (CN); Jian Yao, Beijing (CN); Baiyu Pan, Beijing (CN); Ji Wang, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 355 days.

(21) Appl. No.: 15/758,836

(22) PCT Filed: Sep. 19, 2016

(86) PCT No.: PCT/CN2016/099358
§ 371 (c)(1),
(2) Date: Mar. 9, 2018

(87) PCT Pub. No.: WO2017/156994
PCT Pub. Date: Sep. 21, 2017

(65) Prior Publication Data
US 2020/0192930 A1    Jun. 18, 2020

(30) Foreign Application Priority Data
Mar. 18, 2016 (CN) .......................... 2016 1 0159190

(51) Int. Cl.
*G06F 16/30* (2019.01)
*G06F 16/438* (2019.01)
(Continued)

(52) U.S. Cl.
CPC .......... *G06F 16/438* (2019.01); *G06F 16/435* (2019.01); *G06F 16/45* (2019.01); *G06F 16/483* (2019.01)

(58) Field of Classification Search
CPC ................................. G06F 16/40; G06F 16/70
See application file for complete search history.

(56) References Cited

U.S. PATENT DOCUMENTS 7,933,338 B1 * 4/2011 Choudhry ............... G06F 16/70
375/240.26
8,565,228 B1 * 10/2013 Howard ................ H04L 12/283
370/389

(Continued)

FOREIGN PATENT DOCUMENTS

CN    102740143    10/2012
CN    103870454     6/2014

(Continued)

OTHER PUBLICATIONS

Mei et al., "On the Feedback Mechanism of Performance Accountability for Higher Education Institutions based on TOPDIS Method" Journal of Systems & Management, vol. 24(1), p. 14-21, 2015.

*Primary Examiner* — Mahesh H Dwivedi
(74) *Attorney, Agent, or Firm* — Occhiuti & Rohlicek LLP

(57) ABSTRACT

The present disclosure provides a method and device for assessing quality of multimedia resource, wherein the method includes the steps of: determining a cumulative distribution vector of the multimedia resource according to indicator data for describing user behavior on the multimedia resource; determining an upper boundary vector and a lower boundary vector of the multimedia resource according to the cumulative distribution vector; and determining a quality score of the multimedia resource according to the cumulative distribution vector, the upper boundary vector, (Continued)

determining a cumulative distribution vector of the multimedia resource according to the indicator data for describing user behaviors on the multimedia resource — S100 determining an upper boundary vector and a lower boundary vector of the multimedia resource according to the cumulative distribution vector — S120 determining a quality score of the multimedia resource according to the cumulative distribution vector, the upper boundary vector, and the lower boundary vector — S140 and the lower boundary vector. The present disclosure can better describe the quality of multimedia resource, and has a great operability. Moreover, after the quality of multimedia resource is assessed by using the quality assessment method of multimedia resource in the examples of the present disclosure, the feedback of online behaviors can be reflected on the final dynamic and optimized ranking and recommendation of the multimedia resource.

8 Claims, 5 Drawing Sheets

(51) Int. Cl.
*G06F 16/435* (2019.01)
*G06F 16/483* (2019.01)
*G06F 16/45* (2019.01)

(56) References Cited

U.S. PATENT DOCUMENTS

| | | | |
|---|---|---|---|
| 9,405,775 B1* | 8/2016 | Sarukkai | G06F 16/78 |
| 2008/0059287 A1 | 3/2008 | Bonet et al. | |
| 2008/0127280 A1* | 5/2008 | Kuang | H04N 21/4756 725/86 |
| 2010/0299303 A1* | 11/2010 | Horster | G06F 16/3346 706/52 |
| 2013/0031107 A1* | 1/2013 | Pan | G06F 16/435 707/749 |
| 2013/0111510 A1* | 5/2013 | Baker | H04N 21/4788 725/13 |
| 2014/0074857 A1* | 3/2014 | Liu | G06F 16/78 707/748 |
| 2014/0250180 A1* | 9/2014 | Tseng | H04N 21/251 709/204 |
| 2015/0052155 A1* | 2/2015 | Raichelgauz | G06F 16/7864 707/749 |
| 2015/0095320 A1* | 4/2015 | Motte | G06F 16/24578 707/723 |
| 2017/0024391 A1* | 1/2017 | Steck | G06F 16/9535 |

FOREIGN PATENT DOCUMENTS

| | | |
|---|---|---|
| CN | 104182816 | 12/2014 |
| CN | 104506894 | 4/2015 |
| CN | 104616215 | 5/2015 |
| CN | 105843876 | 8/2016 |
| EP | 2 950 551 | 12/2015 |

\* cited by examiner

METHOD AND DEVICE FOR ASSESSING QUALITY OF MULTIMEDIA RESOURCE

CROSS-REFERENCE TO RELATED APPLICATION

This application is the national stage, under 35 USC 371 of PCT application PCT/CN2016/099358, filed Sep. 19, 2016 and claims priority to CN Patent Application No. 201610159190.0, filed on Mar. 18, 2016, the entire contents of which are incorporated herein by reference.

TECHNICAL FIELD

The present disclosure relates to the technical field of Internet, and more particularly, to a method and device for assessing quality of multimedia resource.

BACKGROUND

Native properties (e.g., machine properties) of multimedia resources themselves are used as the main assessment index in existing quality calculations and quality assessment of multimedia resources. For instance, overall quality of multimedia resources may be determined according to such static properties as signal quality, degree of distortion and so on of video and audio resources. Furthermore, the overall quality of multimedia resources could be determined with some properties facing users, such as frame rate, definition or the like, further added.

There also exists some quality assessment methods, in which the overall quality of a multimedia resource is determined by checking network characteristics of the multimedia resource. For example, the characteristics and decoding progress of the data packets transmitted by the streaming media on a network are calculated so as to determine the overall quality of a multimedia resource.

In other words, native properties (e.g., dynamic state and static state) of multimedia resources are used as the main index of quality assessment in some existing quality assessment methods. However, in many cases, users' requirements cannot be met if the quality of a multimedia resource is assessed merely based on the native properties of the multimedia resource. As a result, whether multimedia resources are satisfying or not cannot necessarily be described merely by such native properties as network transmission, definition or the like.

SUMMARY

In some aspects, in general, a method and device are provided for assessing quality of multimedia resource, which could more accurately indicate the quality of multimedia resource.

In order to solve this technical problem, for a first aspect, the present disclosure provides a method for assessing quality of multimedia resource, comprising:

determining a cumulative distribution vector of the multimedia resource according to indicator data for describing user behavior on the multimedia resource;

determining an upper boundary vector and a lower boundary vector of the multimedia resource according to the cumulative distribution vector; and determining a quality score of the multimedia resource according to the cumulative distribution vector, the upper boundary vector, and the lower boundary vector.

Based on the first aspect, in the first possible implementation approach, determining the cumulative distribution vector of the multimedia resource according to the indicator data for describing user behavior on the multimedia resource comprises:

dividing the indicator data of one type of user behaviors into multiple groups;

counting a number of the indicator data of the one type of user behaviors included in each group; and determining a vector formed by the counted numbers for the multiple groups as the cumulative distribution vector of the multimedia resource for the one type of user behaviors.

Based on the first possible implementation approach of the first aspect, in the second possible implementation approach, dividing the indicator data of the one type of user behaviors into the multiple groups comprises:

obtaining a maximum value max(D) and a minimum value min(D) of the indicator data D of the one type of user behaviors;

determining $$\frac{\max(D) - \min(D)}{n}$$

as a dividing interval, wherein n is the number of the multiple groups; and dividing the section max(D)−min(D) into n groups.

Based on the first aspect, or the first possible implementation approach of the first aspect, or the second possible implementation approach of the first aspect, in the third possible implementation approach, determining the quality score of the multimedia resource according to the cumulative distribution vector, the upper boundary vector, and the lower boundary vector comprises:

calculating the quality score by using Formula 1 below, $$\text{Score} = 1 - \frac{DistanceTOTOP}{DistanceBetween}; \quad \text{(Formula 1)}$$

wherein Score is the quality score, DistanceTOTOP is a distance from the cumulative distribution vector to the upper boundary vector, and DistanceBetween is a distance from the upper boundary vector to the lower boundary vector.

For the second aspect, the present disclosure provides a device for assessing quality of multimedia resource, comprising:

a first determining unit configured to determine a cumulative distribution vector of the multimedia resource according to indicator data for describing user behavior on the multimedia resource;

a second determining unit connected to the first determining unit and configured to determine an upper boundary vector and a lower boundary vector of the multimedia resource according to the cumulative distribution vector; and a third determining unit connected to the first and second determining units and configured to determine a quality score of the multimedia resource according to the cumulative distribution vector, the upper boundary vector, and the lower boundary vector.

Based on the second aspect, in the first possible implementation approach, the first determining unit comprises:

a dividing subunit configured to divide the indicator data of one type of user behaviors into multiple groups;

a counting subunit connected to the dividing subunit and configured to count a number of the indicator data of the one type of user behaviors included in each group; and a determining subunit connected to the counting subunit and configured to determine a vector formed by the counted numbers for the multiple groups as the cumulative distribution vector of the multimedia resource for the one type of user behaviors.

Based on the first possible implementation approach of the second aspect, in the second possible implementation approach, the dividing subunit comprises:

an obtaining module configured to obtain a maximum value max(D) and a minimum value min(D) of the indicator data D of the one type of user behaviors;

a determining module connected to the obtaining module and configured to determine $$\frac{\max(D) - \min(D)}{n}$$

as a dividing interval, wherein n is the number of the multiple groups; and a dividing module connected to the determining module and configured to divide the section max(D)−min(D) into n groups.

Based on the second aspect, or the first possible implementation approach of the second aspect, or the second possible implementation approach of the second aspect, in the third possible implementation approach, the third determining unit is configured to calculate the quality score by using Formula 1 below, $$\text{Score} = 1 - \frac{DistanceTOTOP}{DistanceBetween}, \quad \text{(Formula 1)}$$

wherein Score is the quality score, DistanceTOTOP is a distance from the cumulative distribution vector to the upper boundary vector, and DistanceBetween is a distance from the upper boundary vector to the lower boundary vector.

Aspects may have one or more of the following advantages. The method and device for assessing quality of multimedia resource in the examples according to the present disclosure can more accurately indicate the quality of multimedia resource, and also have a great operability. Moreover, by assessing the quality of multimedia resource using the quality assessment method of multimedia resource in the examples of the present disclosure, the feedback of online behaviors can be reflected on the final dynamic and optimal ranking and recommendation of multimedia resource.

Additional features and aspects of the present disclosure will become apparent from the following detailed description of exemplary examples with reference to the attached drawings.

BRIEF DESCRIPTION OF THE DRAWINGS

The drawings, which are incorporated in and constitute a part of the specification, together with the description, illustrate exemplary examples, features and aspects of the present disclosure and serve to explain the principles of the present disclosure.

DETAILED DESCRIPTION

Figure 1:
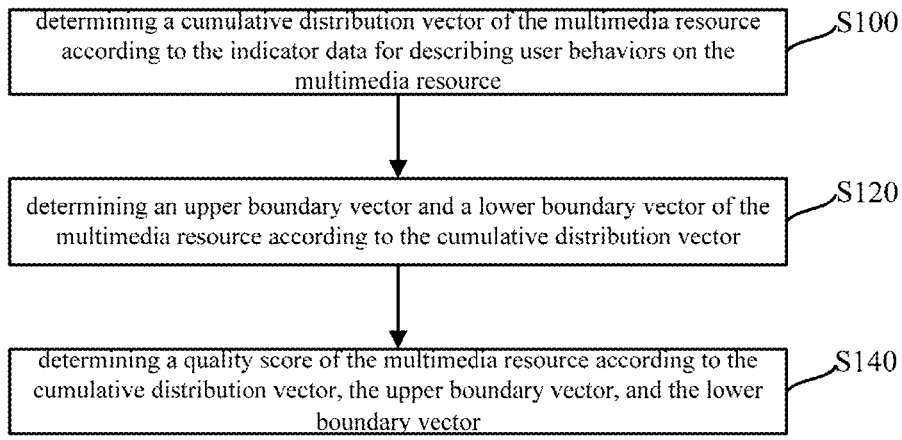
FIG. 1 is a flow chart showing the quality assessment method of multimedia resource according to an Example 1 of the present disclosure.

Various exemplary examples, features and aspects of the present disclosure will be described in detail with reference to the drawings. The same reference numerals in the drawings represent elements having the same or similar functions. Although various aspects of the examples are shown in the drawings, it is unnecessary to proportionally draw the drawings unless otherwise specified.

Herein the term "exemplary" means "used as an instance or example, or explanatory". Any "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, elements and circuits that are well known to a person skilled in the art are not described in detail so that the principle of the present disclosure become apparent.

Example 1

FIG. 1 is a flow chart showing the quality assessment method of multimedia resource according to an Example 1 of the present disclosure. As shown in FIG. 1, the quality assessment method may comprise a step S100, a step S120, and a step S140.

The step S100 comprises determining a cumulative distribution vector of the multimedia resource according to the indicator data for describing user behaviors on the multimedia resource.

Users can use a terminal apparatus to play the multimedia resource. The terminal apparatus can be, for instance, a mobile phone, a mobile internet apparatus (MID), a personal digital assistant (PDA), a laptop computer, a desktop computer, a smart television and so on. The multimedia resource can be, for example, a video, audio, picture and so on.

It should be noted that the multimedia resource in the present disclosure is not limited to the afore-mentioned three examples. One person skilled in the art would appreciate that the key point of the present disclosure is not the multimedia resource, and that any multimedia resource in other forms is also suitable for the present disclosure. In other words, there are no restrictions on the specific form of the multimedia resource in the present disclosure.

Indicator data can be used for describing user behaviors on such multimedia resource as the video, audio and so on. In addition, user behaviors on the multimedia resource may include various types, e.g. thumb-up/thumb-down, commenting, recommending (forwarding), collecting, playing, downloading or the like.

Thumb-up/thumb-down refers to an operation of "Thumb-up" or "Thumb-down" made by user for the multimedia resource being played according to the user's supportive or objective attitude to the multimedia resource. Thumb-up/thumb-down usually includes the identity (vid) of the multimedia resource being played, the operation of thumb-up/thumb-down, related information of the operator (user), the operation time, the IP (e.g. the user's mobile phone or computer and so on), and the like.

Commenting refers to an operation of the user providing a comment at a corresponding position according to the user's understanding on the content and form of the multimedia resource being played. Commenting usually includes the identity (vid) of the multimedia resource being played, the specific content of the comment, related information of the operator (user), the operation time, the IP, and the like.

Collecting refers to a recording operation performed by user based on the user's understanding on the content and form of the multimedia resource being played so that this multimedia resource could be conveniently retrieved in the future. Collecting usually includes the identity (vid) of the multimedia resource being played, related information of the operator (user), the operation time, the IP, and the like.

Recommending (forwarding) refers to an off-site push operation made by user based on the user's understanding on the content and form of the multimedia resource being played. Recommending usually includes the identity (vid) of the multimedia resource being played, related information of the operator (user), the operation time, the IP, the recommendation platform, and the like.

Playing refers to a user's watching behavior with respect to the multimedia resource. Playing usually includes identity (vid) of the multimedia resource being played, related information of the operator (user), the operation time, the IP, the length of the play time, and the like.

Downloading refers to an operation of downloading to the local performed by user based on the user's understanding on the content and form of the multimedia resource being played. Downloading usually includes the identity (vid) of the multimedia resource being played, related information of the operator (user), the operation time, the IP, the downloading progress, and the like.

In fact, the building process of user behaviors is a mapping process from problem domain to behavior domain: f: ProblemDomain→UserBehavior. Wherein, ProblemDomain refers to the problem domain, and UserBehavior refers to the set of user behaviors.

Each business department can perform assessment by choosing optimal user behaviors according to the background data and page functions of the department itself. According to practical effects, the user behaviors which can faithfully reflect the users' demands and intentions are recommended, so that the quality assessment (calculation) of multimedia resource is more accurate.

Specifically, indicator data can be used for measuring each user behavior in each type of user behaviors. Details for the indicator data for each type of user behaviors are as follows.

Suppose that one IP can perform thumb-up or thumb-down only once for one multimedia resource, then the timing of thumb-up/thumb-down operation made by the user for the multimedia resource can be used as the indicator data for measuring the user behaviors of the thumb-up/thumb-down type. If the playing-finishing progress of the multimedia resource is calculated, then the playing-finishing progress of the multimedia resource will be recorded every time the operation of thumb-up/thumb-down happens. Theoretically, it is expected that there is no operation of thumb-down from the user, and that the behavior of thumb-up happens as early as possible (it is also fallacious if the behavior of thumb-up happens too early).

The timings and the emotions of commenting operations made by the users for the multimedia resource can be used as the indicator data for measuring the user behaviors of the commenting type. If the playing-finishing progress of the multimedia resource is calculated, then the playing-finishing progress of the multimedia resource will be recorded every time the operation of commenting happens. Furthermore, positive and negative emotions of the user's comment can be quantified as much as possible. Theoretically, it is expected that there is no negative comment from the user, and that the behavior of commenting happens as early as possible (it is also fallacious if the behavior of commenting happens too early).

Suppose that one IP can perform collecting only once for one multimedia resource, then the timing of collecting operation made by the user for the multimedia resource can be used as the indicator data for measuring the user behaviors of the collecting type. If the playing-finishing progress of the multimedia resource is calculated, then the playing-finishing progress of the multimedia resource will be recorded every time the operation of collecting happens. Theoretically, it is expected that there are operations of collecting from the users, and that the behavior of collecting happens as early as possible (it is also fallacious if the behavior of collecting happens too early).

The timings of recommending operations made by the users for the multimedia resource, and the leading-back flow rate ratio can be used as the indicator data for measuring the user behaviors of the recommending type. Wherein, leading-back flow rate ratio=Times of leading-back/Times of emerging, the times of leading-back refer to the times that the recommended multimedia resource is opened for the second time, and the times of emerging refer to the times that the multimedia resource has be recommended. If the playing-finishing progress of the multimedia resource is calculated, then the playing-finishing progress of the multimedia resource will be recorded every time the operation of recommending happens.

Furthermore, the leading-back flow rate ratio can be calculated by crawling related data outstations. Theoretically, it is expected that there are recommending behaviors by the users, that the recommending behaviors happen as early as possible (it is also fallacious if the behavior of recommending happens too early), and that the leading-back flow rate ratio is as high as possible.

The playing-finishing percentage of the multimedia resource, and the times of dragging the process bar (fast backward, fast forward) by the users can be used as the indicator data for measuring the user behaviors of the playing type. It is expected that the playing-finishing percentage of the users is as high as possible, that there is no fast-forward dragging, and that there are reasonable times of fast-backward dragging.

The timings of downloading operation made by the users for the multimedia resource and the downloading-finishing progress can be used as the indicator data for measuring the user behaviors of the downloading type. If the playing-finishing progress of the multimedia resource is calculated, then the playing-finishing progress of the multimedia resource will be recorded every time the operation of downloading happens. The downloading-finishing progress can be used for measuring the user's determination to download the multimedia resource and the network condition. Theoretically, it is expected that there are downloading behaviors by the users, and that the behavior of downloading happens as early as possible (it is also fallacious if the behavior of downloading happens too early); it is also expected that 100% of the multimedia resource is fully downloaded.

It should be noted that the examples of the present disclosure merely exemplify several types of user behaviors and their indicator data. One person skilled in the art would appreciate that there may be other types of user behaviors, and that it is not necessary to extract all of the above indicator data during actual operations, instead, the right amount of data can be extracted according to business necessities and whether the system is over-burdened.

In fact, the building process of indicator data is a mapping process from user behaviors to indicator data: f: UserBehavior→Indicators. Wherein, UserBehavior refers to the set of user behaviors, and Indicators refers to the set of indicator data. In addition, the building process of a cumulative distribution vector is a mapping process from indicator space to vector space: f: Indicators→$V^n$. Wherein, Indicators refers to the set of the indicator data, and $V^n$ refers to n-dimensional vector space.

The step S120 comprises determining an upper boundary vector and a lower boundary vector of the multimedia resource according to the cumulative distribution vector.

Specifically, after the cumulative distribution vector on the indicator data of user behaviors is determined, the best performance and the worst performance, i.e. the upper boundary and the lower boundary, of the indicator data can be defined. For instance, the best performance comprises the maximum number of the thumb-up/thumb-down operations performed by the users for the multimedia resource at the same timing (in a reasonable range), the highest value of leading-back flow rate ratio of the recommended multimedia resource, and the maximum number of users who have fully watched the multimedia resource. Wherein, both the upper boundary and the lower boundary of the multimedia resource on the indicator data can be expressed by using the vectors, i.e. the upper boundary vector and the lower boundary vector.

The step S140 comprises determining a quality score of the multimedia resource according to the cumulative distribution vector, the upper boundary vector, and the lower boundary vector.

The quality score of the multimedia resource can be determined according to the cumulative distribution vector. Theoretically, the farther a cumulative distribution vector is from the lower boundary vector, and the closer the cumulative distribution vector is to the upper boundary vector, the better the user behavior will be, which further shows a higher quality of the multimedia resource. For instance, distance proportion can be used for defining the quality score of the multimedia resource.

In one possible implementation approach, the step of determining the quality score of the multimedia resource according to the cumulative distribution vector, the upper boundary vector, and the lower boundary vector may include: calculating the quality score by using the Formula 1 below.

$$\text{Score} = 1 - \frac{DistanceTOTOP}{DistanceBetween} \qquad \text{Formula 1}$$

Wherein, Score is the quality score, DistanceTOTOP is the distance from the cumulative distribution vector to the upper boundary vector, and DistanceBetween is the distance from the upper boundary vector to the lower boundary vector.

According to the above Formula 1, the smaller the distance DistanceTOTOP from the cumulative distribution vector to the upper boundary vector is, the higher the quality score Score will be. The methods such as cosine similarity or multi-dimensional Euclidean distance can be used for calculating the distance between vectors. Besides, cosine similarity and multi-dimensional Euclidean distance can ensure that the value range of the quality score Score is [0,1].

Wherein, the method of cosine similarity includes drawing the vectors in a vector space according to their coordinate values, acquiring the angle between two vectors, and calculating the cosine value of the angle, and the cosine value can be used for representing similarity of the two vectors. The smaller the angle is, the closer the cosine value will be to 1, which means that the directions of the two vectors are more consistent and that the two vectors are more similar. Euclidean distance is a commonly adopted distance definition, which refers to the real distance between two points in an m-dimensional space. For instance, if a point $A(x_1, y_1)$ and a point $B(x_2, y_2)$ exist in a two-dimensional space, the Euclidean distance between the point $A(x_1, y)$ and the point $B(x_2,y_2)$ is $\sqrt{(x_1-x_2)^2+(y_1-y_2)^2}$.

Both cosine similarity and Euclidean distance are easy to understand and can be conveniently operated, so they are widely applied for calculating the distance between vectors. Cosine similarity is a fine method of outputting normalized results, and Euclidean distance is a method of outputting global values. In practical operations, either one of the methods can be chosen according to necessities.

In fact, the building process of the quality score of multimedia resource is a mapping process from a cumulative distribution vector to the interval [0,1]: f: $V^n$→[0,1], wherein $V^n$ is a n-dimensional vector space, and [0,1] is the value range of the quality score Score.

The quality assessment method provided in Example 1 of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment method provided in Example 1 of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment methods which are based on native properties of multimedia resource to complete collecting and measuring related indicators.

Furthermore, if a period is taken as an inspection interval, user behaviors will be dynamic to some extent, so user behaviors usually have characteristics of cumulative. Therefore, after the quality of multimedia resource is assessed by using the quality assessment method provided in Example 1 of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 2

Since there are many types of user behaviors, the quality assessment of multimedia resource can be performed either by using indicator data for only one type of user behaviors, or can be performed by using such as statistical methods according to the indicator data for multiple types of user behaviors.

For instance, the quality score for each type of user behaviors can be individually calculated, then the quality scores for all types of user behaviors can be averaged, and the averaged score can be determined as the quality score of the multimedia resource.

One person skilled in the art would appreciate that averaging is merely an implementation approach, and that the primary aim of the present disclosure can also be realized via other implementation approaches, such as weighted summation or the like.

Figure 2:
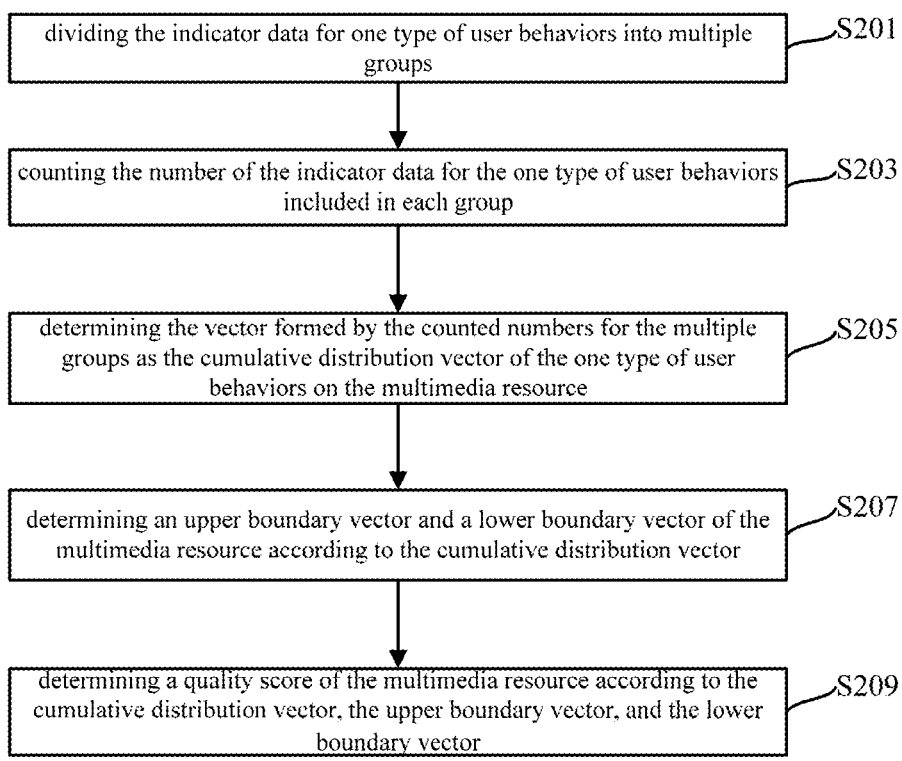
FIG. 2 is a flow chart showing the quality assessment method of multimedia resource according to an Example 2 of the present disclosure.

FIG. 2 is a flow chart showing the quality assessment method of multimedia resource according to an Example 2 of the present disclosure. As shown in FIG. 2, this quality assessment method may comprises a step S201, a step S203, a step S205, a step S207, and a step S209.

The step S201 comprises dividing the indicator data for one type of user behaviors into multiple groups.

For example, indicator data for one type of user behaviors can be divided into multiple groups by using a method of non-overlapping grouping; for another example, indicator data for one type of user behaviors can be divided into multiple groups by using a method of overlapping grouping.

In one possible implementation approach, the step of dividing the indicator data for one type of user behaviors into multiple groups comprises:

obtaining the maximum value max(D) and the minimum value min(D) of the indicator data D for this type of user behaviors;

determining $$\frac{\max(D) - \min(D)}{n}$$

as a dividing interval, wherein n is the number of groups; and dividing the interval max(D)−min(D) into n groups.

For example, if it is assumed that indicator data D for one type of user behaviors is divided into multiple groups by using the non-overlapping grouping method, which is very effective and commonly used for describing data distribution characteristics, the process of grouping is as follows: if it is assumed that a group of data D in real number field is given, the maximum value max(D) and the minimum value min(D) of the data D can be obtained; then the interval max(D)−min(D) (which is also called Range) is equally divided into n groups, and the corresponding dividing interval is $$\frac{\max(D) - \min(D)}{n}$$

which is also called grouping interval. Then n groups correspond to n grouping intervals, for instance, $$\left[\min(D), \min(D) + \frac{\max(D) - \min(D)}{n}\right) \text{ and}$$

$$\left(\max(D) - \frac{\max(D) - \min(D)}{n}, \max(D)\right]$$

are respectively the first grouping interval and the last grouping interval.

For another example, if it is assumed that indicator data for one type of user behaviors is divided into multiple groups by using the overlapping grouping method, which is used for observing overall variation of the data, the process of grouping is as follows: if it is assumed that a group of data D in real number field is given, the maximum value max(D) and the minimum value min(D) of the data D can be obtained, and the interval [min(D), max(D)] contains all of the data D; then the interval max(D)−min(D) is equally divided into n overlapping grouping intervals, for instance, $$[\min(D), \max(D)] \text{ and}$$

$$\left[\min(D), \min(D) + \frac{\max(D) - \min(D)}{n}\right)$$

are respectively the largest grouping interval and the smallest grouping interval.

The step S203 comprises counting the number of the indicator data for the one type of user behaviors included in each group.

After the indicator data for the one type of user behaviors is divided into multiple groups, the number of indicator data falling into each group can be respectively counted.

The step S205 comprises determining the vector formed by the counted numbers for the multiple groups as the cumulative distribution vector of the one type of user behaviors on the multimedia resource.

For example, the cumulative distribution vector of the one type of user behaviors can be rapidly and directly determined according to the histogram of frequency distribution in which x axis represents the grouping interval and y axis represents the counted number.

The step S207 comprises determining an upper boundary vector and a lower boundary vector of the multimedia resource according to the cumulative distribution vector.

The step S209 comprises determining a quality score of the multimedia resource according to the cumulative distribution vector, the upper boundary vector, and the lower boundary vector.

For details about S207 and S209, relevant description for S120 and S140 in the above Example 1 could be referred to.

The quality assessment method provided in Example 2 of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment method provided in Example 2 of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment methods which are based on native properties of multimedia resource to complete collecting and measuring related indicators.

Furthermore, after the quality of multimedia resource is assessed by using the quality assessment method provided in Example 2 of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 3

Figure 3A:
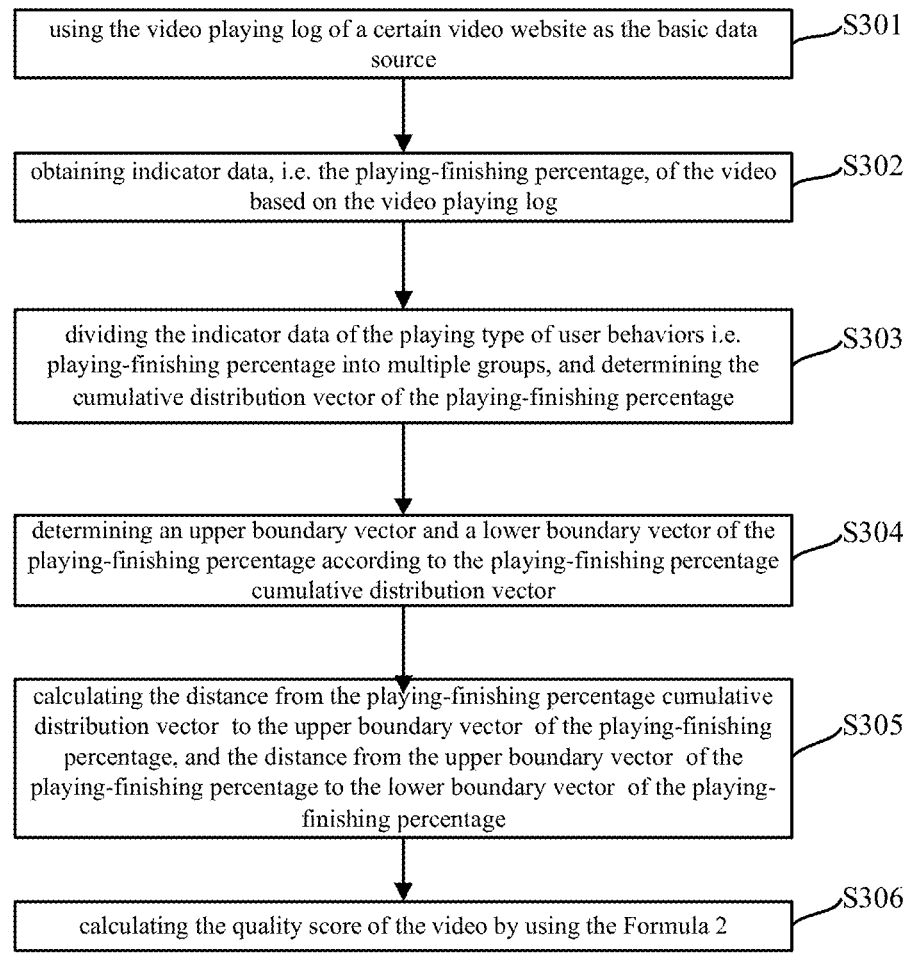
FIG. 3a is a flow chart showing the quality assessment method of multimedia resource according to an Example 3 of the present disclosure.

FIG. 3a is a flow chart showing the quality assessment method of multimedia resource according to an Example 3 of the present disclosure. In this example of the present disclosure, the quality assessment method of multimedia resource provided in the present disclosure will be exemplified by using indicator data of the playing type of user behaviors, i.e. the playing-finishing percentage of the multimedia resource (e.g. the watching-finishing percentage of a video).

The quality assessment method may comprise a step S301 of using the video playing log of a certain video website as the basic data source. The original video playing log is a data table at least containing the tetrad {Vids,PlayLength,FullLength,Time}, wherein Vids indicates the video being watched; PlayLength is the playing time length of the watching behavior, and is usually counted in seconds; FullLength is the full time length of the video being watched; and Time is the timestamp when the watching behavior happens.

Each line of the original video playing log records the user's watching behavior by clicking the video at the corresponding timestamp. By searching the log with different timestamps, the data for users' watching behaviors in one day, one hour, or even at any moment can be obtained. Table 1 is an exemplary fragment from the video playing log.

TABLE 1

Exemplary Fragment from Video Playing Log

| Vids | PlayLength | FullLength | Time |
|------|------------|------------|----------|
| ... | ... | ... | ... |
| 1 | 2 | 100 | 20160105 |
| 1 | 12 | 100 | 20160105 |
| 1 | 11 | 100 | 20160105 |
| 1 | 53 | 100 | 20160105 |
| 1 | 34 | 100 | 20160105 |
| 1 | 23 | 100 | 20160105 |
| 1 | 77 | 100 | 20160105 |
| 1 | 88 | 100 | 20160105 |
| 1 | 88 | 100 | 20160105 |
| 1 | 96 | 100 | 20160105 |
| 1 | 100 | 100 | 20160105 |
| 1 | 112 | 100 | 20160105 |
| 1 | 69 | 100 | 20160105 |
| 1 | 41 | 100 | 20160105 |
| 1 | 79 | 100 | 20160105 |
| ... | ... | ... | ... |

The pre-processing can be performed on the afore-mentioned tetrad {Vids,PlayLength,FullLength,Time}, by collecting the watching time lengths of users in the video playing log. For example, video playing data in a special time period can be selected by defining the Time field, e.g. a video playing data with Time "20160105" can be selected from the video playing log. The playing-finishing percentage of a video (which is also called watching-finishing percentage of the video) with Vids "1" can be calculated by using PlayLength/FullLength, so as to obtain a perc field for the video with Vids "1". Data screening can also be performed on the playing-finishing percentage data of the video, for instance, the data with a perc>100% should be discarded.

The quality assessment method may further comprise a step S302 of obtaining indicator data, i.e. the playing-finishing percentage, of the video based on the video playing log. Wherein the playing-finishing percentage of the video perc refers to the ratio between the playing time length and the full time length of the video, namely, $$perc = \frac{PlayLength}{FullLength}.$$

By performing pre-processing on the video playing log in Table 1, information set, containing Vids of the video being watched, the playing-finishing percentage perc of each watching behavior, and the timestamp Time showing when each watching behavior happens, could be generated to record the users' watching-finishing status on the video. By using the video playing log in Table 1, the play-finishing percentage of the video being watched, as shown in Table 2 below, can be obtained. It should be noted that, in order to be focused on the problem per se, the timestamp Time showing when the watching behavior happens is omitted from Table 2.

TABLE 2

Example of Video's Playing-finishing percentage perc

| Vids | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| perc (%) | 2 | 12 | 11 | 53 | 34 | 23 | 77 | 88 | 88 | 96 | 100 | 69 | 41 | 79 |

The quality assessment method may further comprise a step S303 of dividing the indicator data of the playing type of user behaviors i.e. playing-finishing percentage perc into multiple groups, and determining the cumulative distribution vector of the playing-finishing percentage perc.

Specifically, the playing-finishing percentage perc can be divided into multiple groups by using either the non-overlapping grouping method or the overlapping grouping method described in Example 2. Moreover, a frequency distribution histogram can be used for displaying the frequency distribution of the playing-finishing percentage perc, wherein the height of the rectangle in the frequency distribution histogram represents the ratio between the frequency of corresponding group and the grouping interval (since the grouping interval is a constant, and for the convenience of drawing and watching the histogram, the height of the rectangle is directly used for representing the frequency). Moreover, the frequency distribution histogram is capable of clearly showing the frequency distribution of each group, and can easily show the frequency differences between groups.

The abscissa axis of the frequency distribution histogram is a universe range from 0%-100% of the playing-finishing percentage perc. The grouping interval can be determined according to actual situation. According to the statistics, suitable grouping interval can reflect the distribution characteristics of sample data, while over-small grouping interval may result in too many groups and over-large grouping interval may result in too few groups, both of which may cover up the distribution characteristics of the playing-finishing percentage perc. In addition, since over-small grouping intervals may cause too many groups, the dimensionality of the cumulative distribution vector subsequently determined according to the playing-finishing percentage, i.e. the cumulative distribution vector of the playing-finishing percentage, will be too high, which brings excessive calculation burden when analyzing massive data. Therefore, the grouping interval in this example is determined to be 10%.

Figure 3B:
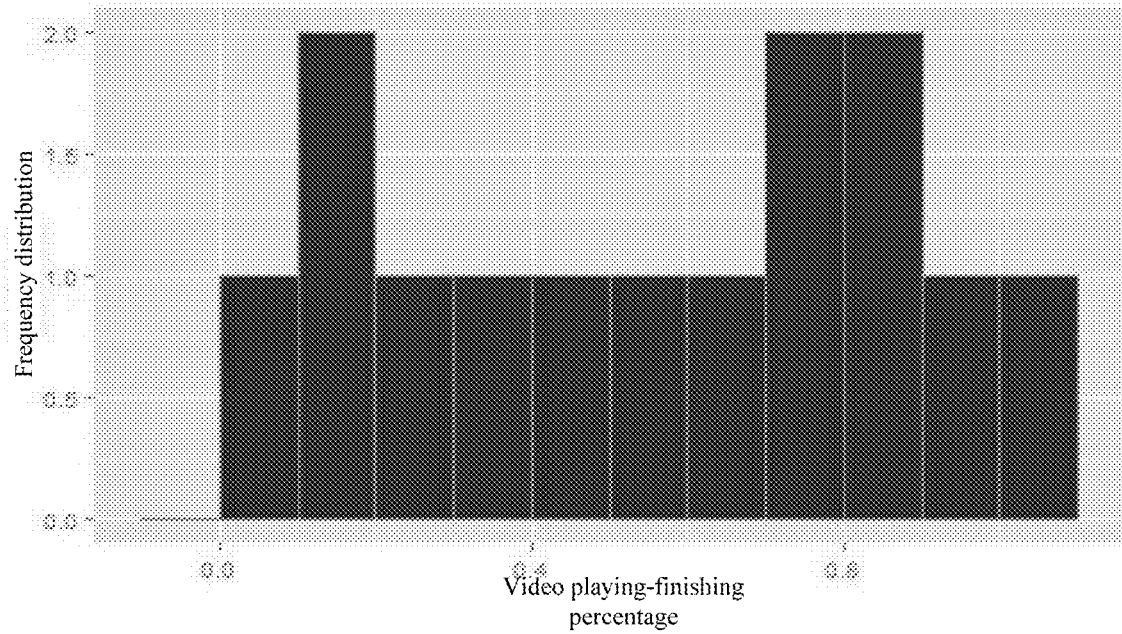
FIG. 3b illustrates a frequency distribution histogram of playing-finishing percentage.

If the playing-finishing percentage perc is divided into multiple groups by using the non-overlapping grouping method, the universe interval, i.e. 0%-100%, of the playing-finishing percentage perc could be divided into 10 groups with the grouping interval of 10%, as a result, 10 isometric non-overlapping sample intervals (groups), i.e. 0%-10%, 10%-20%, . . . , 90%-100%, will be formed, thereby obtaining the playing-finishing percentage frequency distribution histogram shown in FIG. 3b.

Figure 3C:
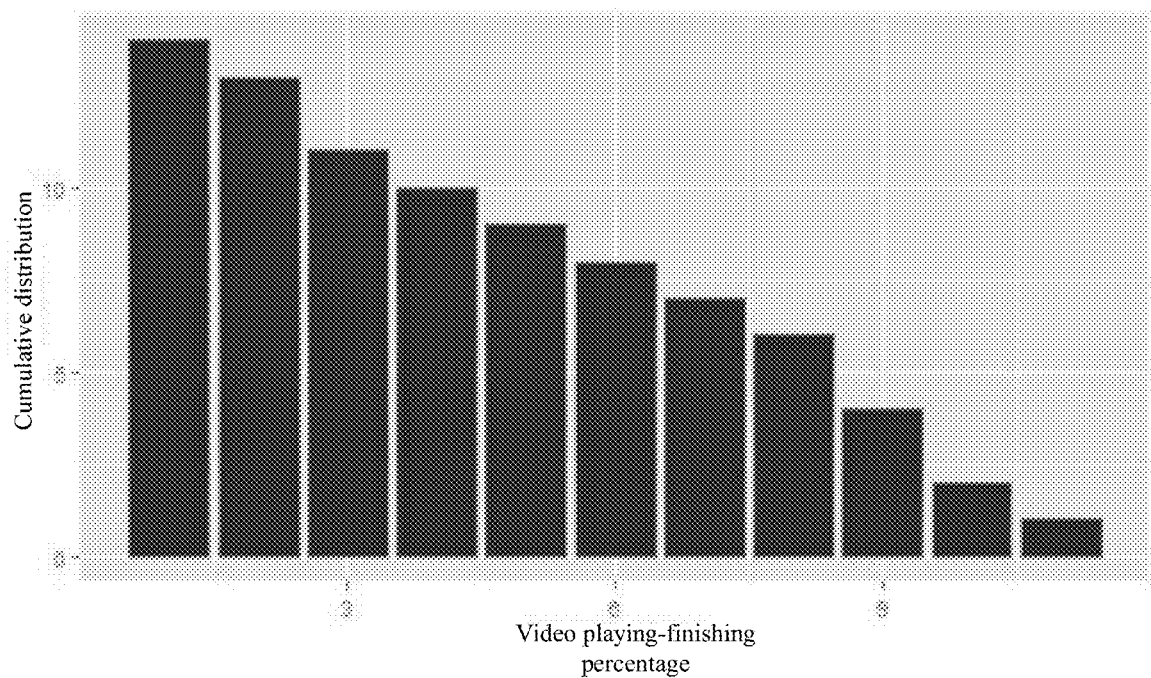
FIG. 3c illustrates a frequency distribution histogram of playing-finishing percentage.

If the playing-finishing percentage perc is divided into multiple groups by using the overlapping grouping method, the universe interval, i.e. 0%-100%, of the playing-finishing percentage perc could be divided into 10 groups with the grouping interval of 10%, as a result, 10 overlapping sample intervals (groups), i.e. 0%-10%, 0%-20%, . . . , 0%-100%, will be formed, thereby obtaining the playing-finishing percentage frequency distribution histogram shown in FIG. 3c.

Of course, in this example, it is preferable to adopt the overlapping grouping method (i.e. cumulative distribution count) to divide the playing-finishing percentage perc into multiple groups and determine the playing-finishing percentage cumulative distribution vector. Sample intervals respectively with a playing-finishing percentage perc of 0%, 10%, 20%, 30%, . . . , 100% are used. For the covering characteristics of video playing, the count for a playing-finishing percentage perc of 30% certainly comprises the count for a playing-finishing percentage perc of 10%.

Suppose that the data set of playing-finishing percentage of a video vid in a particular time period is P={perc|0%≤perc≤100%}, the overlapping grouping at the grouping interval of m/100 and statistical analysis is performed on the data set P of the playing-finishing percentage, wherein 100 mod m=0 (100 is divisible by m), and (100/m)+1 grouping data including the single-point grouping 0% could be obtained. If (0%,i %] represents the counting interval of the playing-finishing percentage i %, then the vector $(f_0, f_1, \ldots, f_{100/m})$ formed by corresponding counts of groups 0%, (0%, 10%], . . . (0%, 100%] is the playing-finishing percentage cumulative distribution vector $V_{vid}$ of the video.

It should be noted that the critical point for each group could be mapped to a progress point for actual playing progress of the video, and that the users' playing-finishing percentage can describe the playing progress of the video. Single-point group 0% can be understood as the number of times that the video is clicked, namely, the count of the group 0% could be increased by 1 every time the video is clicked, and the number of the records for the targeted video in the video playing log can be used as the count of the group 0% directly. Apparently, if m %>c %, then the times for playing and finishing m % will definitely be no more than the times for playing and finishing c %, and the counts of the group (0%, m %] will definitely be no more than the count of the group (0%,c %]. For instance, the times for finishing 100% of the video will definitely be no more than the times for finishing 20% of the video. Therefore, the internal data of the playing-finishing percentage cumulative distribution vector $V_{vid}$ is a non-increasing series.

According to the definition of the playing-finishing percentage cumulative distribution vector $V_{vid}$, the playing-finishing percentage frequency distribution histogram shown in FIG. 3c can be obtained. In addition, based on FIG. 3c, the playing-finishing percentage cumulative distribution vector $V_{vid}$=(14, 13, 11, 10, 9, 8, 7, 6, 4, 2, 1) can be obtained.

The quality assessment method may further comprise a step S304 of determining an upper boundary vector and a lower boundary vector of the playing-finishing percentage according to the playing-finishing percentage cumulative distribution vector $V_{vid}$.

It is desired that each video can be fully played, namely, the number of users who finish watching the video should be equal to the number of users who click and open the video. Therefore, each element of the upper boundary vector should be the same as the frequency for finishing 0%. Therefore, the upper boundary vector $V_t$, i.e. the possibly best performance for playing and finishing a video, can be defined according to the playing-finishing percentage cumulative distribution vector $V_{vid}$. In other words, suppose that the playing-finishing percentage cumulative distribution vector of a video $V_{vid}$=$(f_0, f_1, \ldots, f_{100/m})$, then the upper boundary vector $V_t$ of the playing-finishing percentage of the video satisfies $V_t$=$(f_0, f_0, \ldots, f_0)$ and $|V_t|=|V_{vid}|$.

Similarly, the possibly worst performance for playing and finishing a video would be that no actual watching behavior exists every time the video is clicked and opened. Hence, except for corresponding number of clicks of 0%, the cumulative frequencies in all of the other sample intervals are 0. Therefore, the lower boundary vector $V_b$ can be defined according to the playing-finishing percentage cumulative distribution vector $V_{vid}$. In other words, suppose that the playing-finishing percentage cumulative distribution vector of a video $V_{vid}=(f_0, f_1, \ldots, f_{100/m})$, then the lower boundary vector $V_b$ of the playing-finishing percentage of the video satisfies $V_b=(f_0, 0, \ldots, 0)$ and $|V_b|=|V_{vid}|$.

Continue with the afore-mentioned example, when the value of m is 10, the upper and lower boundary vectors of the playing-finishing ratio are respectively $V_t=(14,14,14,14,14,14,14,14,14,14,14)$ and $V_b=(14,0,0,0,0,0,0,0,0,0,0)$.

The quality assessment method may further comprise a step S305 of after determining the playing-finishing percentage cumulative distribution vector $V_{vid}$, the upper boundary vector $V_t$ and the lower boundary vector $V_b$ of the playing-finishing percentage, calculating the distance from the playing-finishing percentage cumulative distribution vector $V_{vid}$ to the upper boundary vector $V_t$ of the playing-finishing percentage, and the distance from the upper boundary vector $V_t$ of the playing-finishing percentage to the lower boundary vector $V_b$ of the playing-finishing percentage.

Since the value of m is 10, 11-dimensional Euclidean distance is used for calculating the above two distances, wherein the specific definition of 11-dimensional Euclidean distance is as follows.

Suppose that X and Y are two vectors, then the distance between the vector X and the vector Y is $d(X, Y)=\sqrt{\Sigma(x_j-y_j)^2}$, wherein $j\in[1,11]$, $x_j$ is the value of the vector X at the jth position, and $y_j$ is the value of the vector Y at the jth position.

Based on this distance definition, it can be calculated that the distance $d(V_{vid},V_t)$ from the playing-finishing percentage cumulative distribution vector $V_{vid}=(14,13,11,10,9,8,7,6,4,2,1)$ to the upper boundary vector $V_t=(14,14,14,14,14,14,14,14,14,14,14)$ of the playing-finishing percentage is 24.759, and the distance $d(V_t, V_b)$ from the upper boundary vector $V_t=(14,14,14,14,14,14,14,14,14,14,14)$ of the playing-finishing percentage to the lower boundary vector $V_b=(14,0,0,0,0,0,0,0,0,0,0)$ of the playing-finishing percentage is 44.272.

The quality assessment method may further comprise a step S306 of, after calculating the distance from the playing-finishing percentage cumulative distribution vector $V_{vid}$ to the upper boundary vector $V_t$ of the playing-finishing percentage, and the distance from the upper boundary vector $V_t$ of the playing-finishing percentage to the lower boundary vector $V_b$ of the playing-finishing percentage, calculating the quality score of the video by using the Formula 2 below:

$$\text{Score}(vid) = 1 - \frac{d(V_{vid}, V_t)}{d(V_t, V_b)}, \quad \text{Formula 2}$$

namely, the quality score of the video $$\text{Score}(vid) = 1 - \frac{24.759}{44.272} = 0.4408.$$

For example, quality scores can be calculated for massive videos on a certain video website, and a video quality score statistical table for this video website, as shown in Table 3 below, will be obtained.

TABLE 3

| | | | | | | |
|---|---|---|---|---|---|---|
| Quality Score Statistics for Videos on a Certain Video Website | | | | | | |
| Number of Videos | Minimum | First Quartile | Median | Average | Third Quartile | Maximum |
| 2818673 | 0.0000017 | 0.494000 | 0.6667000 | 0.6961000 | 1.0000000 | 1.0000000 |

According to the above Table 3, the third quartile in actual data has already reached the maximum, which means at least 25% of the video quality scores are 1. This is caused by the long tail effect of video playing, namely, a large amount of videos are played only once or twice, and are completely played.

Figure 3D:
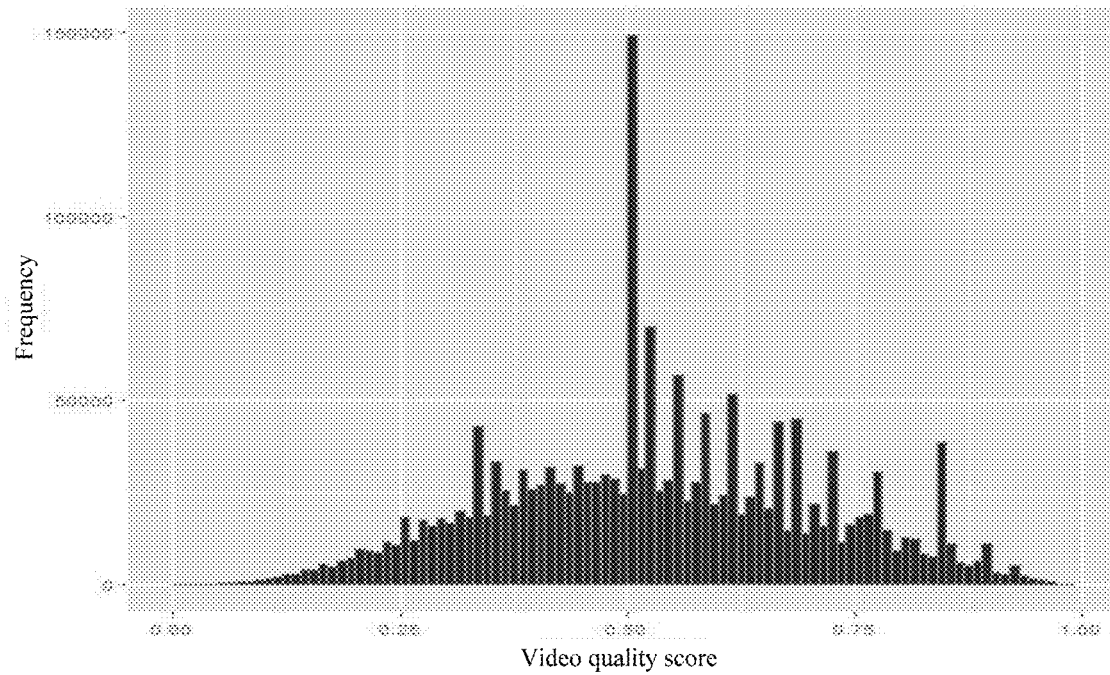
FIG. 3d illustrates a distribution histogram of the quality scores of video.

By removing the long tail effect of video playing, a quality score distribution histogram of a video shown in FIG. 3d can be obtained. After these video quality scores are obtained, it is possible to perform multiple calculations by introducing new types of user behaviors, or to perform calculation by introducing new indicator data of the videos, thereby getting prepared for subsequent video search and video recommendation.

The quality assessment method provided in Example 3 of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment method provided in Example 3 of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment methods which are based on native properties of multimedia resource to complete collecting and measuring related indicators.

Furthermore, after the quality of multimedia resource is assessed by using the quality assessment method provided in Example 3 of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 4

Figure 4:
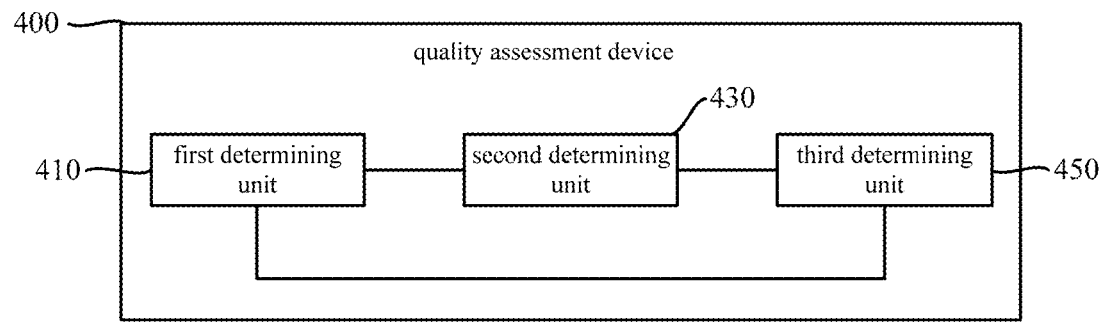
FIG. 4 is a structural block diagram showing the quality assessment device of multimedia resource according to an Example 4 of the present disclosure.

FIG. 4 is a structural block diagram showing the quality assessment device of multimedia resource according to an Example 4 of the present disclosure. The quality assessment device 400 provided in Example 4 of the present disclosure is configured to realize the quality assessment method shown in FIG. 1. As shown in FIG. 4, the quality assessment device 400 may comprise a first determining unit 410, a second determining unit 430, and a third determining unit 450.

The first determining unit 410 is configured to determine a cumulative distribution vector of the multimedia resource according to the indicator data for describing user behaviors on the multimedia resource.

Users can use a terminal apparatus to play the multimedia resource. The terminal apparatus can be, for instance, a mobile phone, a mobile internet apparatus (MID), a personal digital assistant (PDA), a laptop computer, a desktop computer, a smart television and so on. The multimedia resource can be, for example, a video, audio, picture and so on.

It should be noted that the multimedia resource in the present disclosure is not limited to the afore-mentioned three examples. One person skilled in the art would appreciate that the key point of the present disclosure is not the multimedia resource, and that any multimedia resource in other forms is also suitable for the present disclosure. In other words, there are no restrictions on the specific form of the multimedia resource in the present disclosure.

Indicator data can be used for describing user behaviors on such multimedia resource as the video, audio and so on. In addition, user behaviors on the multimedia resource may include various types, e.g. thumb-up/thumb-down, commenting, recommending (forwarding), collecting, playing, downloading or the like.

Thumb-up/thumb-down refers to an operation of "Thumb-up" or "Thumb-down" made by user for the multimedia resource being played according to the user's supportive or objective attitude to the multimedia resource. Thumb-up/thumb-down usually includes the identity (vid) of the multimedia resource being played, the operation of thumb-up/thumb-down, related information of the operator (user), the operation time, the IP (e.g. the user's mobile phone or computer and so on), and the like.

Commenting refers to an operation of the user providing a comment at a corresponding position according to the user's understanding on the content and form of the multimedia resource being played. Commenting usually includes the identity (vid) of the multimedia resource being played, the specific content of the comment, related information of the operator (user), the operation time, the IP, and the like.

Collecting refers to a recording operation performed by user based on the user's understanding on the content and form of the multimedia resource being played so that this multimedia resource could be conveniently retrieved in the future. Collecting usually includes the identity (vid) of the multimedia resource being played, related information of the operator (user), the operation time, the IP, and the like.

Recommending (forwarding) refers to an off-site push operation made by user based on the user's understanding on the content and form of the multimedia resource being played. Recommending usually includes the identity (vid) of the multimedia resource being played, related information of the operator (user), the operation time, the IP, the recommendation platform, and the like.

Playing refers to a user's watching behavior with respect to the multimedia resource. Playing usually includes identity (vid) of the multimedia resource being played, related information of the operator (user), the operation time, the IP, the length of the play time, and the like.

Downloading refers to an operation of downloading to the local performed by user based on the user's understanding on the content and form of the multimedia resource being played. Downloading usually includes the identity (vid) of the multimedia resource being played, related information of the operator (user), the operation time, the IP, the downloading progress, and the like.

In fact, the building process of user behaviors is a mapping process from problem domain to behavior domain: f: ProblemDomain→UserBehavior. Wherein, ProblemDomain refers to the problem domain, and UserBehavior refers to the set of user behaviors.

Each business department can perform assessment by choosing optimal user behaviors according to the background data and page functions of the department itself. According to practical effects, the user behaviors which can faithfully reflect the users' demands and intentions are recommended, so that the quality assessment (calculation) of multimedia resource is more accurate.

Specifically, indicator data can be used for measuring each user behavior in each type of user behaviors. Details for the indicator data for each type of user behaviors are as follows.

Suppose that one IP can perform thumb-up or thumb-down only once for one multimedia resource, then the timing of thumb-up/thumb-down operation made by the user for the multimedia resource can be used as the indicator data for measuring the user behaviors of the thumb-up/thumb-down type. If the playing-finishing progress of the multimedia resource is calculated, then the playing-finishing progress of the multimedia resource will be recorded every time the operation of thumb-up/thumb-down happens. Theoretically, it is expected that there is no operation of thumb-down from the user, and that the behavior of thumb-up happens as early as possible (it is also fallacious if the behavior of thumb-up happens too early).

The timings and the emotions of commenting operations made by the users for the multimedia resource can be used as the indicator data for measuring the user behaviors of the commenting type. If the playing-finishing progress of the multimedia resource is calculated, then the playing-finishing progress of the multimedia resource will be recorded every time the operation of commenting happens. Furthermore, positive and negative emotions of the user's comment can be quantified as much as possible. Theoretically, it is expected that there is no negative comment from the user, and that the behavior of commenting happens as early as possible (it is also fallacious if the behavior of commenting happens too early).

Suppose that one IP can perform collecting only once for one multimedia resource, then the timing of collecting operation made by the user for the multimedia resource can be used as the indicator data for measuring the user behaviors of the collecting type. If the playing-finishing progress of the multimedia resource is calculated, then the playing-finishing progress of the multimedia resource will be recorded every time the operation of collecting happens. Theoretically, it is expected that there are operations of collecting from the users, and that the behavior of collecting happens as early as possible (it is also fallacious if the behavior of collecting happens too early).

The timings of recommending operations made by the users for the multimedia resource, and the leading-back flow rate ratio can be used as the indicator data for measuring the user behaviors of the recommending type. Wherein, leading-back flow rate ratio=Times of leading-back/Times of emerging, the times of leading-back refer to the times that the recommended multimedia resource is opened for the second time, and the times of emerging refer to the times that the multimedia resource has be recommended. If the playing-finishing progress of the multimedia resource is calculated, then the playing-finishing progress of the multimedia resource will be recorded every time the operation of recommending happens. Furthermore, the leading-back flow rate ratio can be calculated by crawling related data outstations. Theoretically, it is expected that there are recommending behaviors by the users, that the recommending behaviors happen as early as possible (it is also fallacious if the behavior of recommending happens too early), and that the leading-back flow rate ratio is as high as possible.

The playing-finishing percentage of the multimedia resource, and the times of dragging the process bar (fast backward, fast forward) by the users can be used as the indicator data for measuring the user behaviors of the playing type. It is expected that the playing-finishing percentage of the users is as high as possible, that there is no fast-forward dragging, and that there are reasonable times of fast-backward dragging.

The timings of downloading operation made by the users for the multimedia resource and the downloading-finishing progress can be used as the indicator data for measuring the user behaviors of the downloading type. If the playing-finishing progress of the multimedia resource is calculated, then the playing-finishing progress of the multimedia resource will be recorded every time the operation of downloading happens. The downloading-finishing progress can be used for measuring the user's determination to download the multimedia resource and the network condition. Theoretically, it is expected that there are downloading behaviors by the users, and that the behavior of downloading happens as early as possible (it is also fallacious if the behavior of downloading happens too early); it is also expected that 100% of the multimedia resource is fully downloaded.

It should be noted that the examples of the present disclosure merely exemplify several types of user behaviors and their indicator data. One person skilled in the art would appreciate that there may be other types of user behaviors, and that it is not necessary to extract all of the above indicator data during actual operations, instead, the right amount of data can be extracted according to business necessities and whether the system is over-burdened.

In fact, the building process of indicator data is a mapping process from user behaviors to indicator data: f: UserBehavior→Indicators. Wherein, UserBehavior refers to the set of user behaviors, and Indicators refers to the set of indicator data. In addition, the building process of a cumulative distribution vector is a mapping process from indicator space to vector space: f: Indicators→$V^n$. Wherein, Indicators refers to the set of the indicator data, and $V^n$ refers to n-dimensional vector space.

The second determining unit 430 is connected to the first determining unit 410 and configured to determine an upper boundary vector and a lower boundary vector of the multimedia resource according to the cumulative distribution vector.

Specifically, after the cumulative distribution vector on the indicator data of user behaviors is determined by the first determining unit 410, the best performance and the worst performance, i.e. the upper boundary and the lower boundary, of the indicator data can be defined by the second determining unit 430. For instance, the best performance comprises the maximum number of the thumb-up/thumb-down operations performed by the users for the multimedia resource at the same timing (in a reasonable range), the highest value of leading-back flow rate ratio of the recommended multimedia resource, and the maximum number of users who have fully watched the multimedia resource. Wherein, both the upper boundary and the lower boundary of the multimedia resource on the indicator data can be expressed by using the vectors, i.e. the upper boundary vector and the lower boundary vector.

The third determining unit 450 is connected to the first determining unit 410 and the second determining unit 430, and is configured to determine a quality score of the multimedia resource according to the cumulative distribution vector, the upper boundary vector and the lower boundary vector.

The third determining unit 450 can determine the quality score of the multimedia resource according to the cumulative distribution vector determined by the first determining unit 410, and the upper and lower boundary vectors determined by the second determining unit 430. Theoretically, the farther a cumulative distribution vector is from the lower boundary vector, and the closer the cumulative distribution vector is to the upper boundary vector, the better the user behavior will be, which further shows a higher quality of the multimedia resource. For instance, distance proportion can be used for defining the quality score of the multimedia resource.

In one possible implementation approach, the third determining unit 450 specifically calculates the quality score by using the Formula 1 below.

$$\text{Score} = 1 - \frac{DistanceTOTOP}{DistanceBetween} \quad \text{Formula 1}$$

Wherein, Score is the quality score, DistanceTOTOP is the distance from the cumulative distribution vector to the upper boundary vector, and DistanceBetween is the distance from the upper boundary vector to the lower boundary vector.

According to the above Formula 1, the smaller the distance DistanceTOTOP from the cumulative distribution vector to the upper boundary vector is, the higher the quality score Score will be. The methods such as cosine similarity or multi-dimensional Euclidean distance can be used for calculating the distance between vectors. Besides, cosine similarity and multi-dimensional Euclidean distance can ensure that the value range of the quality score Score is [0,1].

Wherein, the method of cosine similarity includes drawing the vectors in a vector space according to their coordinate values, acquiring the angle between two vectors, and calculating the cosine value of the angle, and the cosine value can be used for representing similarity of the two vectors. The smaller the angle is, the closer the cosine value will be to 1, which means that the directions of the two vectors are more consistent and that the two vectors are more similar. Euclidean distance is a commonly adopted distance definition, which refers to the real distance between two points in an m-dimensional space. For instance, if a point $A(x_1, y_1)$ and a point $B(x_2, y_2)$ exist in a two-dimensional space, the Euclidean distance between the point $A(x_1, y_1)$ and the point $B(x_2, y_2)$ is $\sqrt{(x_1-x_2)^2+(y_1-y_2)^2}$.

Both cosine similarity and Euclidean distance are easy to understand and can be conveniently operated, so they are widely applied for calculating the distance between vectors.

Cosine similarity is a fine method of outputting normalized results, and Euclidean distance is a method of outputting global values. In practical operations, either one of the methods can be chosen according to necessities.

In fact, the building process of the quality score of multimedia resource is a mapping process from a cumulative distribution vector to the interval [0,1]: f: $V^n \rightarrow [0,1]$, wherein $V^n$ is a n-dimensional vector space, and [0,1] is the value range of the quality score Score.

The quality assessment device provided in the example of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment device provided in the example of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment devices which are based on native properties of multimedia resource to complete collecting and measuring related indicators.

Furthermore, if a period is taken as an inspection interval, user behaviors will be dynamic to some extent, so user behaviors usually have characteristics of cumulative. Therefore, after the quality of multimedia resource is assessed by using the quality assessment device provided in the example of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 5

Since there are many types of user behaviors, the quality assessment of multimedia resource can be performed either by using indicator data for only one type of user behaviors, or can be performed by using such as statistical methods according to the indicator data for multiple types of user behaviors.

For instance, the quality score for each type of user behaviors can be individually calculated, then the quality scores for all types of user behaviors can be averaged, and the averaged score can be determined as the quality score of the multimedia resource.

One person skilled in the art would appreciate that averaging is merely an implementation approach, and that the primary aim of the present disclosure can also be realized via other implementation approaches, such as weighted summation or the like.

Figure 5:
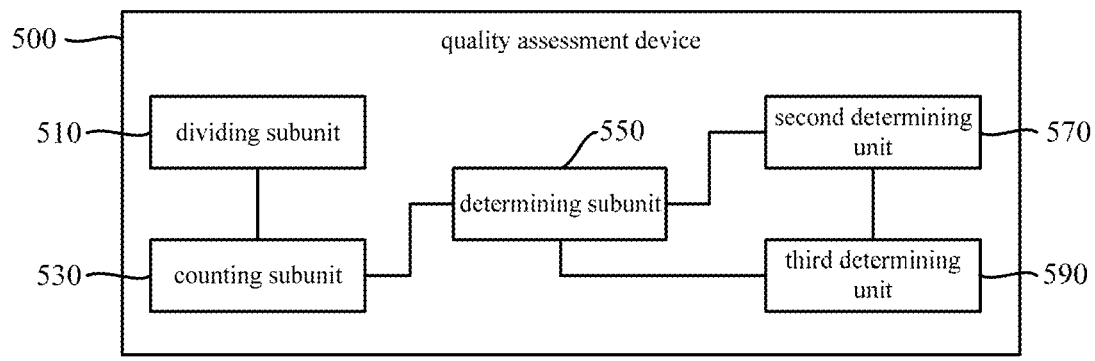
FIG. 5 is a structural block diagram showing the quality assessment device of multimedia resource according to an Example 5 of the present disclosure.

FIG. 5 illustrates a structural block diagram showing the quality assessment device of multimedia resource according to an Example 5 of the present disclosure. The quality assessment device 500 provided in Example 5 is used for realizing the quality assessment method shown in FIG. 2. As shown in FIG. 5, this quality assessment device 500 may mainly comprise a dividing subunit 510, a counting subunit 530, a determining subunit 550, a second determining unit 570, and a third determining unit 590.

The dividing subunit 510 is configured to divide the indicator data for one type of user behaviors into multiple groups.

For example, the dividing subunit 510 can divide the indicator data for one type of user behaviors into multiple groups by using a method of non-overlapping grouping; for another example, the dividing subunit 510 can divide the indicator data for one type of user behaviors into multiple groups by using a method of overlapping grouping.

In one possible implementation approach, the dividing subunit 510 may comprise:

an obtaining module configured to obtain the maximum value max(D) and the minimum value min(D) of the indicator data D for this type of user behaviors;

a determining module connected to the obtaining module and configured to determine $$\frac{\max(D) - \min(D)}{n}$$

as a dividing interval, wherein n is the number of groups; and a dividing module connected to the determining module and configured to divide the section max(D)−min(D) into n groups.

For example, if it is assumed that the dividing subunit 510 divides the indicator data for one type of user behaviors into multiple groups by using the non-overlapping grouping method, which is very effective and commonly used for describing data distribution characteristics, the process of grouping is as follows: if it is assumed that a group of data D in real number field is given, the obtaining module 511 can firstly obtain the maximum value max(D) and the minimum value min(D) of the data D; then the dividing module 515 can equally divide the interval max(D)−min(D) (which is also called Range) into n groups, and the corresponding dividing interval is $$\frac{\max(D) - \min(D)}{n}$$

which is also called grouping interval. Then, n groups correspond to n grouping intervals, for instance, $$\left[\min(D), \min(D) + \frac{\max(D) - \min(D)}{n}\right) \text{ and }$$
$$\left(\max(D) - \frac{\max(D) - \min(D)}{n}, \max(D)\right]$$

are respectively the first grouping interval and the last grouping interval.

For another example, if it is assumed that the subunit 510 divides the indicator data for one type of user behaviors into multiple groups by using the overlapping grouping method, which is used for observing overall variation of the data, the process of grouping is as follows: if it is assumed that a group of data D in real number field is given, the obtaining module 511 can firstly obtain the maximum value max(D) and the minimum value min(D) of the data D, and the interval [min(D),max(D)] contains all of the data D; then the dividing module 515 can equally divide the interval max (D)−min(D) into n overlapping grouping intervals, for instance, $$[\min(D), \max(D)] \text{ and}$$
$$\left[\min(D), \min(D) + \frac{\max(D) - \min(D)}{n}\right)$$

are respectively the largest grouping interval and the smallest grouping interval.

The counting subunit 530 is connected to the dividing subunit 510 and configured to count the number of the indicator data for this type of user behaviors included in each group.

After the dividing subunit 510 divides the indicator data for one type of user behaviors into multiple groups, the counting subunit 530 can respectively count the number of indicator data falling into each group.

The determining subunit 550 is connected to the counting subunit 530 and configured to determine the vector formed by the counted numbers for the multiple groups as the cumulative distribution vector of the one type of user behaviors on the multimedia resource.

For example, the cumulative distribution vector of the one type of user behaviors can be rapidly and directly determined according to the histogram of frequency distribution in which x axis represents the grouping interval and y axis represents the counted number.

The second determining unit 570 is connected to the determining subunit 550 and configured to determine an upper boundary vector and a lower boundary vector of the multimedia resource according to the cumulative distribution vector.

The third determining unit 590 is connected to the determining subunit 550 and the second determining unit 570, and is configured to determine a quality score of the multimedia resource according to the cumulative distribution vector, the upper boundary vector, and the lower boundary vector.

For details about the second determining unit 570 and the third determining unit 590, relevant descriptions for the second determining unit 430 and the third determining unit 450 in the above Example 4 could be referred to.

The quality assessment device provided in the example of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment device provided in the example of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment devices which are based on native properties of multimedia resource to complete collecting and measuring related indicators.

Furthermore, if a period is taken as an inspection interval, user behaviors will be dynamic to some extent, so user behaviors usually have characteristics of cumulative. Therefore, after the quality of multimedia resource is assessed by using the quality assessment device provided in the example of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 6

Figure 6:
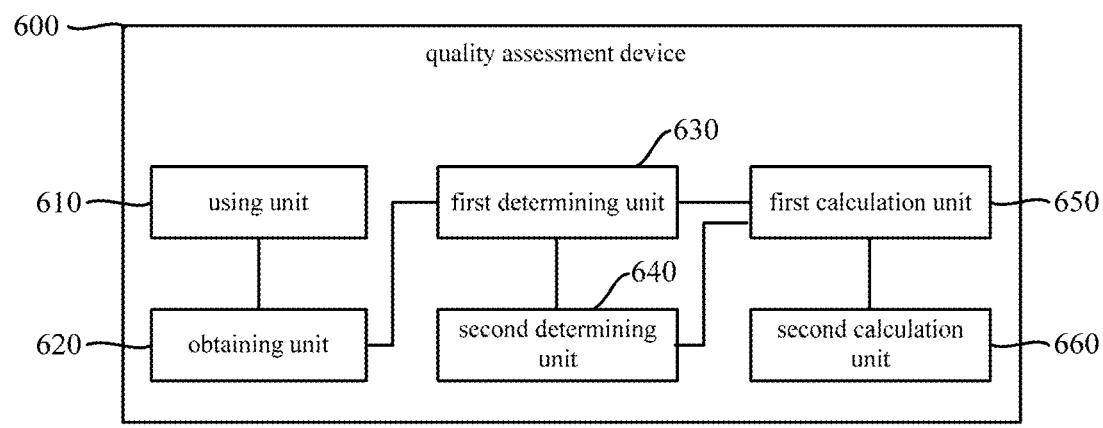
FIG. 6 is a structural block diagram showing the quality assessment device of multimedia resource according to an Example 6 of the present disclosure.

FIG. 6 illustrates a structural block diagram showing the quality assessment device of multimedia resource according to an Example 6 of the present disclosure. In this example of the present disclosure, the quality assessment device of multimedia resource provided in the present disclosure will be exemplified by using indicator data of the playing type of user behaviors, i.e. the playing-finishing percentage of the multimedia resource (e.g. the watching-finishing percentage of a video). The quality assessment device 600 provided in Example 6 is used for realizing the quality assessment method shown in FIG. 3a. As shown in FIG. 6, the quality assessment device 600 may mainly comprise a using unit 610, an obtaining unit 620, a first determining unit 630, a second determining unit 640, a first calculation unit 650, and a second calculation unit 660.

The using unit 610 is configured to use the video playing log of a certain website as the basic data source. The original video playing log is a data table at least containing the tetrad {Vids, PlayLength, FullLength, Time}, wherein Vids indicates the video being watched; PlayLength is the playing time length of the watching behavior, and is usually counted in seconds; FullLength is the full time length of the video being watched; and Time is the timestamp when the watching behavior happens.

Each line of the original video playing log records the user's watching behavior by clicking the video at the corresponding timestamp. By searching the log with different timestamps, the data for users' watching behaviors in one day, one hour, or even at any moment can be obtained. Table 1 in Example 3 is an exemplary fragment from the watching log data of a video.

The pre-processing can be performed on the afore-mentioned tetrad {Vids, PlayLength, FullLength, Time}, by collecting the watching time lengths of users in the video playing log. For example, video playing data in a special time period can be selected by defining the Time field, e.g. a video playing data with Time "20160105" can be selected from the video playing log. The playing-finishing percentage of a video (which is also called watching-finishing percentage of the video) with Vids "1" can be calculated by using PlayLength/FullLength, so as to obtain a perc field for the video with Vids "1". Data screening can also be performed on the playing-finishing percentage data of the video, for instance, the data with a perc>100% should be discarded.

The obtaining unit 620 is connected to the using unit 610 and configured to obtain indicator data, i.e. the playing-finishing percentage of the video based on the video playing log. Wherein the playing-finishing percentage of the video perc refers to the ratio between the playing time length and the full time length of the video, namely, $$perc = \frac{PlayLength}{FullLength}.$$

For details, relevant description for step S302 in Example 3 could be referred to.

The first determining unit 630 is connected to the obtaining unit 620, and is configured to divide the indicator data playing-finishing percentage perc of the playing type of user behaviors into multiple groups, and determine the cumulative distribution vector of the indicator data playing-finishing percentage per.

Specifically, the first determining unit 630 can divide the playing-finishing percentage perc into multiple groups by using either the non-overlapping grouping method or the overlapping grouping method described in Example 2. Moreover, a frequency distribution histogram can be used for displaying the frequency distribution of the playing-finishing percentage perc, wherein the height of the rectangle in the frequency distribution histogram represents the ratio between the frequency of corresponding group and the grouping interval (since the grouping interval is a constant, and for the convenience of drawing and watching the histogram, the height of the rectangle is directly used for representing the frequency). Moreover, the frequency distribution histogram is capable of clearly showing the frequency distribution of each group, and can easily show the frequency differences between groups. For details, relevant description for step S303 in Example 3 could be referred to.

The second determining unit 640 is connected to the first determining unit 630 and is configured to determine an upper boundary vector and a lower boundary vector of the playing-finishing percentage according to playing-finishing percentage cumulative distribution vector $V_{vid}$.

For details, relevant description for step S304 in Example 3 could be referred to.

The first calculation unit 650 is connected to the first determining unit 630 and the second determining unit 640, and is configured to calculate, after the playing-finishing percentage cumulative distribution vector $V_{vid}$ is determined by the first determining unit 630, and the upper boundary vector $V_t$ and the lower boundary vector $V_b$ of the playing-finishing percentage are determined by the second determining unit 640, the distance from the playing-finishing percentage cumulative distribution vector $V_{vid}$ to the upper boundary vector $V_t$ of the playing-finishing percentage, and the distance from the upper boundary vector $V_t$ of the playing-finishing percentage to the lower boundary vector $V_b$ of the playing-finishing percentage.

For details, relevant description for step S305 in Example 3 could be referred to.

The second calculation unit 660 is connected to the first calculation unit 650, and is configured to calculate, after the distance from the playing-finishing percentage cumulative distribution vector $V_{vid}$ to the upper boundary vector $V_t$ of the playing-finishing percentage, and the distance from the upper boundary vector $V_t$ of the playing-finishing percentage to the lower boundary vector $V_b$ of the playing-finishing percentage are calculated by the first calculation unit 650, the quality score of the video by using the Formula 2 below.

$$Score(vid) = 1 - \frac{d(V_{vid}, V_t)}{d(V_t, V_b)} \qquad \text{Formula 2}$$

For details, relevant description for step S306 in Example 3 could be referred to.

The quality assessment device provided in the example of the present disclosure is based on user experience and is faithful to the users' feeling, by using user behaviors on the multimedia resource for describing the quality of the multimedia resource, which enables the present disclosure to describe the quality of the multimedia resource more accurately.

Moreover, the quality assessment device provided in the example of the present disclosure has a great operability. The reason thereof may be, for Internet applications, plenty of multimedia resources are public online, so users can consume these multimedia resources by behaviors of clicking and watching, while enterprise backgrounds can record these user behaviors via the log system. Therefore, the process of the system providing service is right a process of data preparation for the quality assessment of multimedia resource, and it is simple and easy to obtain the user behaviors on multimedia resources. On the contrary, special staffs and systems are needed for traditional quality assessment devices which are based on native properties of multimedia resource to complete collecting and measuring related indicators.

Furthermore, if a period is taken as an inspection interval, user behaviors will be dynamic to some extent, so user behaviors usually have characteristics of cumulative. Therefore, after the quality of multimedia resource is assessed by using the quality assessment device provided in the example of the present disclosure, the feedback of online behaviors can be reflected on the final dynamic and optimized ranking and recommendation of the multimedia resource. If user behaviors on some multimedia resource ranking higher in the original ranking and recommendation result of multimedia resource are not so ideal, then the quality score of this multimedia resource will decrease in future iterations, so that this multimedia resource will be automatically put behind.

Example 7

Figure 7:
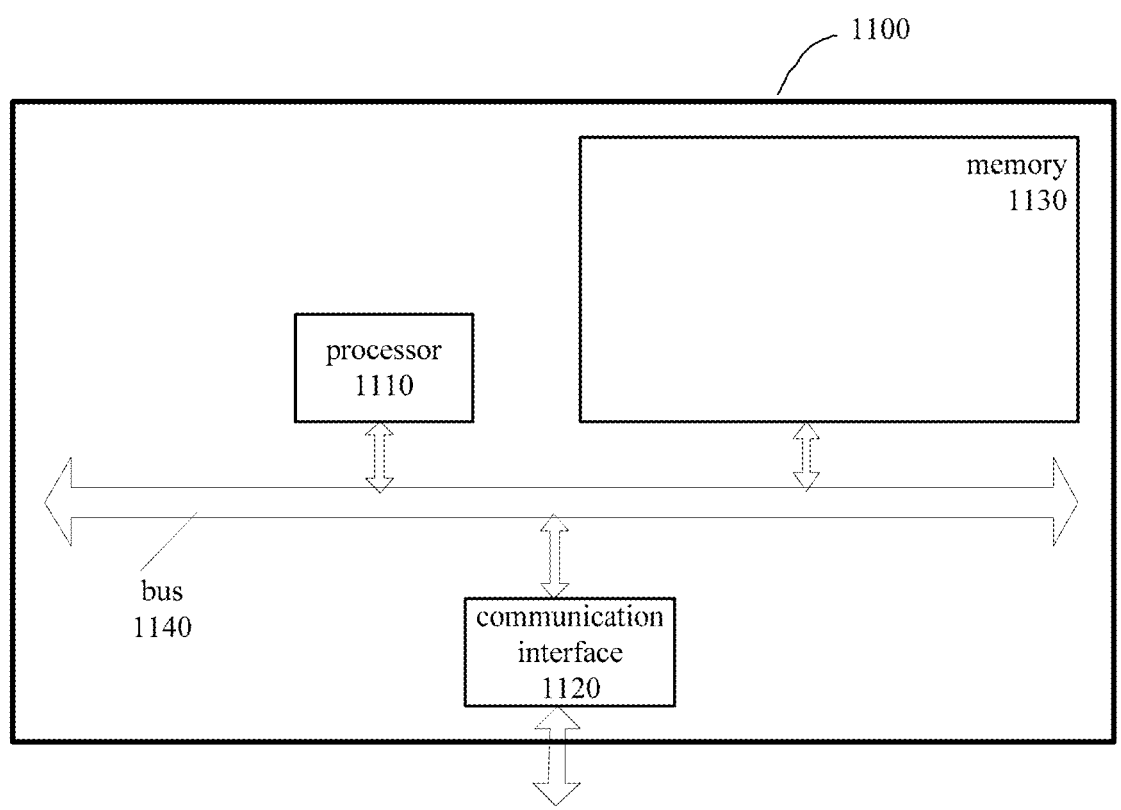
FIG. 7 is a structural block diagram showing the quality assessment apparatus of multimedia resource in another example of the present disclosure.

FIG. 7 is a structural block diagram showing the quality assessment apparatus for multimedia resource in an additional example of the present disclosure. The quality assessment apparatus 1100 for multimedia resource can be a host server, a personal computer PC, or a portable computer or terminal and so on. There is no restriction in the examples of the present disclosure on the specific realization of compute nodes.

The quality assessment apparatus 1100 for multimedia resource comprises: a processor 1110, a communication interface 1120, a memory 1130 and a bus 1140, wherein intercommunications between the processor 1110, the communication interface 1120 and the memory is accomplished via the bus 1140.

The communication interface 1120 is configured to communicate with network equipment including, e.g. the virtual machine management center, the shared memory or the like.

The processor 1110 is configured to execute programs. The processor 1110 can be a CPU, or an ASIC (Application Specific Integrated Circuit), or can be configured to be one or more integrated circuits for implementing the examples of the present disclosure.

The memory 1130 is configured to store files. The memory 1130 may comprise a high-speed RAM memory, and may also comprise a non-volatile memory such as at least one disk memory. The memory 1130 may also be a memory array. The memory 1130 may also be blocked, and the blocks can be combined into a virtual volume according to certain rules.

In one possible mode of execution, the above program may be a program code including computer operation instructions. This program can be specifically used for realizing the operations in each step of the methods in Examples 1, 2 or 3.

One skilled in the art would appreciate that all of the exemplary units and algorithm steps in the examples described in this text can be realized via electronic hardware, or the combination of computer software with electronic hardware. Whether these functions are realized in the form of hardware or software depends on the particular application and design restrictions of the technical solution. One skilled in the art can realize the afore-mentioned functions by choosing different methods according to particular applications, but the realization should not be deemed to be going beyond the scope of the present disclosure.

If the function is realized in the form of computer software, and is sold or used as an independent product, it can be regarded, to a certain extent, that the whole or a part of the technical solution of the present disclosure is reflected in the form of computer software. This computer software product is generally stored in computer-readable non-volatile memory medium, and includes several instructions so that the computer equipment (which can be a personal computer, a server, or a network equipment and so on) can execute all or a part of the steps of the method in each example of the present disclosure. The afore-mentioned memory medium includes all kinds of medium capable of storing program codes, such as U disk, mobile hard disk, ROM (Read-Only Memory), RAM (Random Access Memory), diskette, optical disk and so on.

Afore-mentioned are merely examples of the present disclosure, but the protection scope of the present disclosure is not limited to these examples. Within the technical scope disclosed in the present disclosure, changes or replacement that may easily occur to any one person skilled in the art should be included within the protection scope of the present disclosure. Therefore, the protection scope of the present disclosure should be subject to the protection scopes of the claims.

The methods and devices for assessing quality of multimedia resource in the examples of the present disclosure can better describe the quality of multimedia resource, and have a great operability. Moreover, after the quality of multimedia resource is assessed by using the quality assessment method of multimedia resource in the examples of the present disclosure, the feedback of online behaviors can be reflected on the final dynamic and optimal ranking and recommendation of multimedia resource.

What is claimed is:

1. A method for assessing quality of a multimedia resource, comprising:

maintaining a log storing information about user behavior associated with a plurality of multimedia resources provided to terminal devices, the information about user behavior including information that indicates percentages associated with different instances of user behavior on each multimedia resource, and the information stored in the log including indicator data for describing user behavior on the multimedia resource;

determining a cumulative distribution vector of the multimedia resource according to the indicator data;

determining an upper boundary vector and a lower boundary vector of the multimedia resource according to the cumulative distribution vector;

determining a quality score of the multimedia resource according to the cumulative distribution vector, the upper boundary vector, and the lower boundary vector; and outputting dynamic ranking of the plurality of multimedia resources provided to the terminal devices based at least in part on the quality assessment of the multimedia resource among the plurality of multimedia resources based on the determined quality score.

2. The method according to claim 1, wherein determining the cumulative distribution vector of the multimedia resource according to the indicator data comprises:

dividing the indicator data of one type of user behaviors into multiple groups;

counting a number of the indicator data of the one type of user behaviors included in each group; and determining a vector formed by the counted numbers for the multiple groups as the cumulative distribution vector of the multimedia resource for the one type of user behaviors.

3. The method according to claim 2, wherein dividing the indicator data of the one type of user behaviors into the multiple groups comprises:

obtaining a maximum value max(D) and a minimum value min(D) of the indicator data D of the one type of user behaviors;

determining $$\frac{\max(D) - \min(D)}{n}$$

as a dividing interval, wherein n is the number of the multiple groups; and dividing the section max(D)−min(D) into n groups.

4. The method according to claim 1, wherein determining the quality score of the multimedia resource according to the cumulative distribution vector, the upper boundary vector, and the lower boundary vector comprises:

calculating the quality score by using Formula 1 below, $$\text{Score} = 1 - \frac{DistanceTOTOP}{DistanceBetween}, \quad \text{(Formula 1)}$$

wherein Score is the quality score, DistanceTOTOP is a distance from the cumulative distribution vector to the upper boundary vector, and DistanceBetween is a distance from the upper boundary vector to the lower boundary vector.

5. A device for assessing quality of a multimedia resource, comprising:

memory for maintaining a log storing information about user behavior associated with a plurality of multimedia resources provided to terminal devices, the information about user behavior including information that indicates percentages associated with different instances of user behavior on each multimedia resource, and the information stored in the log including indicator data for describing user behavior on the multimedia resource;
a first determining unit configured to determine a cumulative distribution vector of the multimedia resource according to the indicator data;
a second determining unit connected to the first determining unit and configured to determine an upper boundary vector and a lower boundary vector of the multimedia resource according to the cumulative distribution vector;
a third determining unit connected to the first and second determining units and configured to determine a quality score of the multimedia resource according to the cumulative distribution vector, the upper boundary vector, and the lower boundary vector; and
a communication interface for outputting dynamic ranking of the plurality of multimedia resources provided to the terminal devices based at least in part on the quality assessment of the multimedia resource among the plurality of multimedia resources based on the determined quality score.

6. The device according to claim 5, wherein the first determining unit comprises:
a dividing subunit configured to divide the indicator data of one type of user behaviors into multiple groups;
a counting subunit connected to the dividing subunit and configured to count a number of the indicator data of the one type of user behaviors included in each group; and
a determining subunit connected to the counting subunit and configured to determine a vector formed by the counted numbers for the multiple groups as the cumulative distribution vector of the multimedia resource for the one type of user behaviors.

7. The device according to claim 6, wherein the dividing subunit comprises:
an obtaining module configured to obtain a maximum value max(D) and a minimum value min(D) of the indicator data D of the one type of user behaviors;
a determining module connected to the obtaining module and configured to determine $$\frac{\max(D) - \min(D)}{n}$$

as a dividing interval, wherein n is the number of the multiple groups; and
a dividing module connected to the determining module and configured to divide the section max(D)–min(D) into n groups.

8. The device according to claim 5, wherein the third determining unit is configured to calculate the quality score by using Formula 1 below, $$\text{Score} = 1 - \frac{DistanceTOTOP}{DistanceBetween}, \quad \text{(Formula 1)}$$

wherein Score is the quality score, DistanceTOTOP is a distance from the cumulative distribution vector to the upper boundary vector, and DistanceBetween is a distance from the upper boundary vector to the lower boundary vector.

* * * * *